United States Patent
Lee et al.

(10) Patent No.: US 9,781,188 B2
(45) Date of Patent: Oct. 3, 2017

(54) METHOD FOR TRANSRECEIVING MEDIA CONTENT AND DEVICE FOR TRANSRECEIVING USING SAME

(75) Inventors: Hyeonjae Lee, Seoul (KR); Waqar Zia, Munich (DE); Hotaek Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 13/882,926

(22) PCT Filed: Oct. 27, 2011

(86) PCT No.: PCT/KR2011/008094
§ 371 (c)(1),
(2), (4) Date: May 1, 2013

(87) PCT Pub. No.: WO2012/060581
PCT Pub. Date: May 10, 2012

(65) Prior Publication Data
US 2013/0238758 A1    Sep. 12, 2013

Related U.S. Application Data

(60) Provisional application No. 61/409,126, filed on Nov. 2, 2010.

(51) Int. Cl.
*G06F 15/16* (2006.01)
*H04L 29/08* (2006.01)
(Continued)

(52) U.S. Cl.
CPC ....... *H04L 67/02* (2013.01); *H04N 21/23439* (2013.01); *H04N 21/242* (2013.01);
(Continued)

(58) Field of Classification Search
CPC .................................................... H04L 67/02
(Continued)

(56) References Cited

U.S. PATENT DOCUMENTS

2005/0076136 A1    4/2005    Cho
2005/0238316 A1*   10/2005   MacDonald Boyce
                                        ............................ G11B 27/105
                                                                  386/330

(Continued)

FOREIGN PATENT DOCUMENTS

| CN | 1490980 A | 4/2004 |
|---|---|---|
| CN | 101072341 A | 11/2007 |
| WO | 2011/038013 A2 | 3/2011 |

OTHER PUBLICATIONS

ISO/IEC JTC1/SC29/WG11 MPEG/N11578, "Text of ISO/IEC 23001-6: Dynamic adaptive streaming over HTTP (DASH)", MPEG 94 Meeting, Guangzhou, China, Oct. 2010, Oct. 15, 2010 (Oct. 15, 2010).

(Continued)

*Primary Examiner* — Vivek Srivastava
*Assistant Examiner* — Karina J Garcia-Ching
(74) *Attorney, Agent, or Firm* — Dentons US LLP

(57) ABSTRACT

Provided are a method and device for transmitting/receiving media content via internet. The method includes: configuring the media content with a plurality of representations; dividing the configured representation into a plurality segments; aligning subsegments in the segment; and transmitting one of the representations, wherein the subsegments are aligned to allow the earliest presentation time of the kth subsegment in the first representation to be greater than the latest presentation time of the k−1th subsegment in the second representation among the representations.

17 Claims, 12 Drawing Sheets

(51) Int. Cl.
 *H04N 21/2343* (2011.01)
 *H04N 21/242* (2011.01)
 *H04N 21/44* (2011.01)
 *H04N 21/845* (2011.01)

(52) U.S. Cl.
 CPC ... *H04N 21/44016* (2013.01); *H04N 21/8455* (2013.01); *H04N 21/8456* (2013.01)

(58) Field of Classification Search
 USPC .......................................................... 709/218
 See application file for complete search history.

(56) References Cited

U.S. PATENT DOCUMENTS

| 2008/0074545 | A1 | 3/2008 | Matsubayashi | |
|---|---|---|---|---|
| 2009/0300203 | A1 | 12/2009 | Virdi | |
| 2011/0238789 | A1* | 9/2011 | Luby | H04N 21/23106 709/219 |
| 2012/0042090 | A1* | 2/2012 | Chen | H04L 65/607 709/231 |
| 2012/0114118 | A1 | 5/2012 | Verma | |
| 2012/0317303 | A1* | 12/2012 | Wang | H04L 65/4076 709/231 |

OTHER PUBLICATIONS

MPEG-B Systems: "Text of ISO/IEC 23001-6: Dynamic adaptive streaming over HTTP (DASH)", XP030047210, MPEG Meeting #94 (ISO/IEC JTC1/SC29/WG11), Guangzhou, China, Oct. 11-15, 2010.

Anonymus: "Text of ISO/IEC 2ND dis 23009-1: Dynamic Adaptive Streaming over HTTP (Dash) - Part 1: Media Presentation description and segment formats", XP030018661, MPEG Meeting #97 (ISO/IEC JTC1/SC29WG11), Torino, Italy, Aug. 30, 2011.

LG Electronics: "LGE input for DASH DTS-EE", XP030047262, MPEG Meeting #95 (ISO/IEC JTC1/SC29WG11), Daeagu, South Korea, Nov. 24-28, 2010.

* cited by examiner

FIG.8
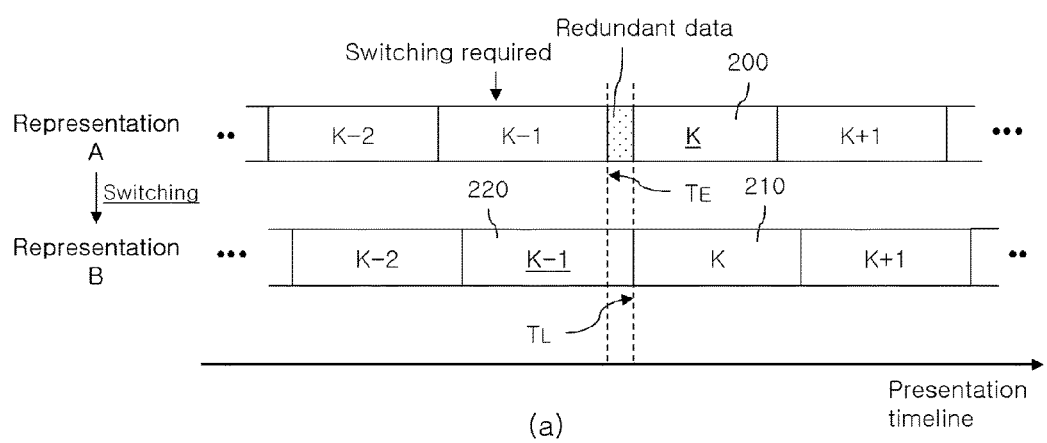
(a)
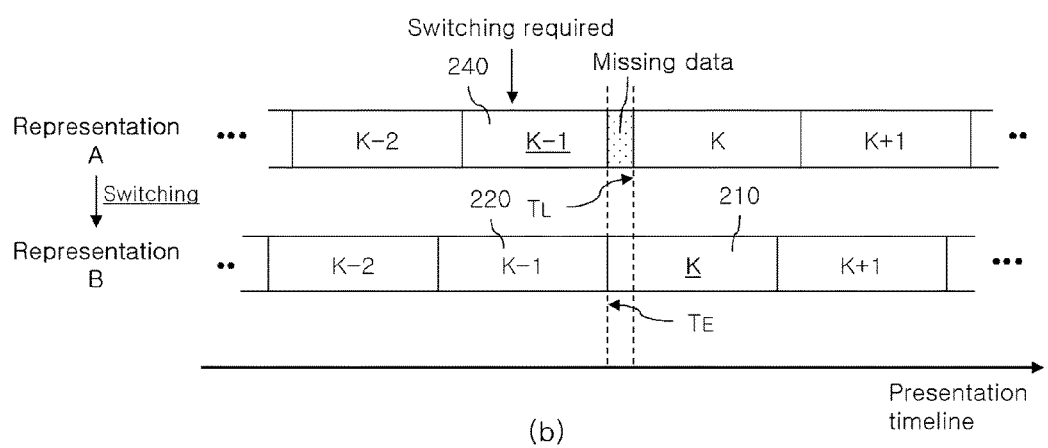
(b)

Box Type: 'm2si'
Container: Segment
Mandatory: Yes
Quantity: One or more

FIG. 13

```
aligned(8) class MPEG2SegmentIndexBox extends FullBox('m2si', version, flags) {
    // the following entry is optional
    unsigned int(32) timescale;
    unsigned int(32) reference_PID;
    unsigned int(16) program_element_count;
    unsigned int(16) reference_count;
    for (i=1; i<= program_element_count; i++)
    {
        unsigned int(32)    PID;
        if (version==0)
        {
            unsigned int(32)            earliest_presentation_time;
        } else
        {
            unsigned int(64)            earliest_presentation_time;
        }
    }
    for(i=1; i <= reference_count; i++)
    {
        bit(1)             reference_type;
        bit(1)             discontinuity;
        bit(1)             contains_PTS;
        bit(1)             contains_RAP;
        const bit(4)       reserved = 0;
        unsigned int(32)   reference_offset;
        unsigned int(32)   subsegment_duration;
        unsigned int(32)   RAP_delta_time;
        if (contains_PTS == 1)
        {
            unsigned int(32)            PTS;
        }
    }
}
```

Box Type: 'mp2s'
Container: File
Mandatory: No
Quantity: One or more

```
aligned(8) class MPEG2SuperSegmentIndexBox extends FullBox('mp2s', version, 0) {
    unsigned int(16) reference_count;
    for(i=1; i <= reference_count; i++)
    {
        unsigned int(32)    segment_index;
        unisgned int(32)    m2si_count;
        unsigned int(32)    offset;
    }
}
```

US 9,781,188 B2

METHOD FOR TRANSRECEIVING MEDIA CONTENT AND DEVICE FOR TRANSRECEIVING USING SAME

CROSS-REFERENCE TO RELATED APPLICATIONS

This application is a 35 USC §371 National Stage entry of International Application No. PCT/KR2011/008094 filed on Oct. 27, 2011, and claims priority of U.S. Provisional Application No. 61/409,126 filed on Nov. 2, 2010, all of which are incorporated by reference in their entirety herein.

BACKGROUND

The present disclosure relates to a method and device for transmitting/receiving media content via internet.

Currently, most of digital broadcastings such as terrestrial, cable, satellite, and Digital Multimedia Broadcasting (DMB) stream AV content by using MPEG-2 Transport Stream (TS).

Additionally, according to the recent rapid growth of internet, a multimedia service providing content by using an Internet protocol (IP) network as a main transport network has been activated. Digital broadcastings such as stereo 3D video broadcasting, Ultra High Definition (UHD) broadcasting, multiview 3D video broadcasting, and hologram broadcasting are evolving into a direction more requiring the amount of data transferred.

However, the MPEG-2 TS having a fixed length packet of 188 bytes may be inefficient to transmit a content having a higher resolution than that of an existing HDTV by using the IP network.

SUMMARY

Embodiments provide a method and device for transmitting/receiving media content with efficient streaming according to a network state.

In one embodiment, provided is a method of transmitting media content via internet. The method includes: configuring the media content with a plurality of representations; dividing the configured representation into a plurality of segments; aligning subsegments in the segment; and transmitting one of the representations, wherein the subsegments are aligned to allow the earliest presentation time of the kth subsegment in the first representation to be greater than the latest presentation time of the k−1th subsegment in the second representation among the representations.

In another embodiment, provided is a method of receiving media content via internet. The method includes: receiving a first representation among a plurality of representations including the media content; switching the received first representation to a second representation; and playing the received first representation, wherein the representation is divided into a plurality of segments and received; and subsegments in the segment are aligned to allow the earliest presentation time of the kth subsegment in one of the first and second representations to be greater than the latest presentation time of the k−1th subsegment in the other representation.

In further another embodiment, provided is a device for transmitting media content via internet. The device includes: a media encoder configuring the media content with a plurality of representations; a segmenter segmenting the configured representation into a plurality of segments, wherein subsegments in the segment are aligned to allow the earliest presentation time of the kth subsegment in the first representation to be greater than the latest presentation time of the k−1th subsegment in the second representation among the representations.

In still further another embodiment, provided is a device for receiving media content via internet. The device includes: a receiving unit receiving one of a plurality of representations including the media content; and a control unit switching the received representation, wherein the representation is divided into a plurality of segments and received; and subsegments in the segment are aligned to allow the earliest presentation time of the kth subsegment in the first representation to be greater than the latest presentation time of the k−1th subsegment in the second representation among the representations.

The details of one or more embodiments are set forth in the accompanying drawings and the description below. Other features will be apparent from the description and drawings, and from the claims.

BRIEF DESCRIPTION OF THE DRAWINGS

FIGS. 8 and 9 are views illustrating a method aligning subsegments according to an embodiment of the present invention.

FIGS. 10 and 11 are views illustrating a method of switching a representation according to an embodiment of the present invention.

FIGS. 12 and 13 are views illustrating a configuration of a segment index box providing metadata on media content according to a first embodiment of the present invention.

DETAILED DESCRIPTION OF THE EMBODIMENTS

Figure 1:
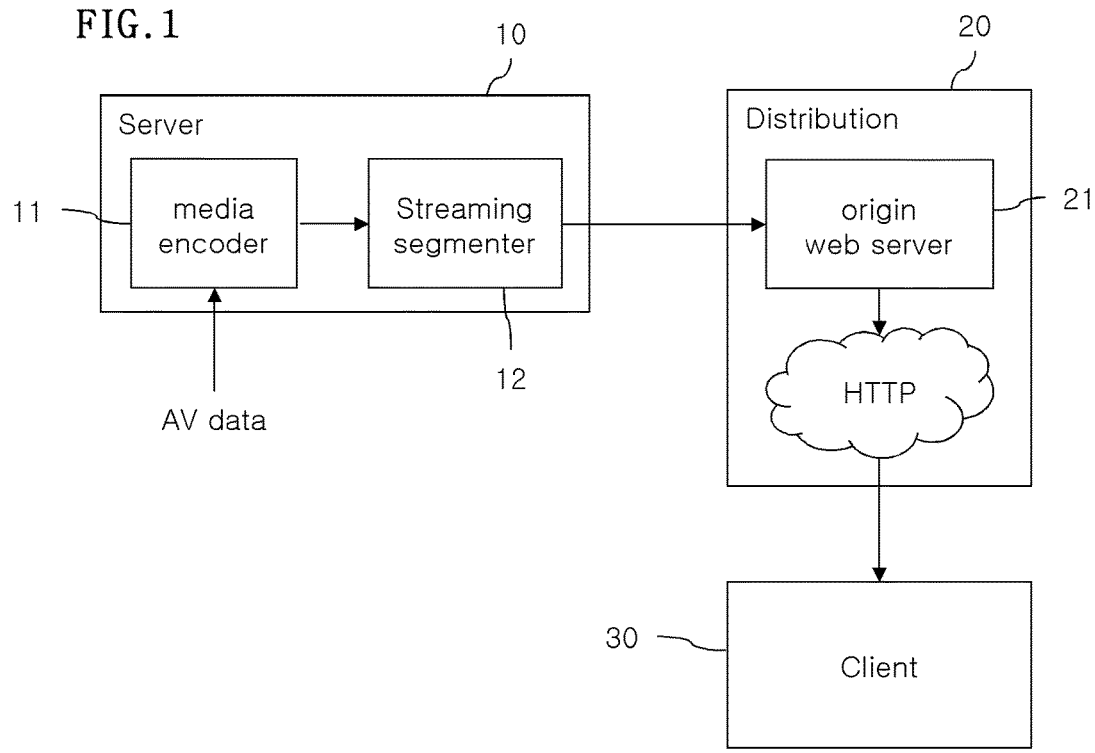
FIG. 1 is a block diagram illustrating a configuration of a content transceiving system according to an embodiment of the present invention.

Hereinafter, a method and device for transmitting/receiving media content via internet will be described with reference to FIGS. 1 to 19.

Hereinafter, detailed descriptions related to well-known functions or configurations will be ruled out in order not to unnecessarily obscure subject matters of the present invention. Moreover, terms described below are defined in consideration of the functions of the present invention and vary according to users, operators' intentions, or customs. Therefore, the definition may be determined based on the entire contents of this specification.

A transmitting device and a receiving device according to an embodiment of the present invention may transmit/receive media content by using an Internet Protocol (IP) based transmitting system. For example, the media content may be streamed by a web server through a Transmission Control Protocol (TCP) and a Hypertext Transfer Protocol (HTTP).

The transmitting device may receive a content from a content provider, and then may convert and transmit the received content, or store it in a media DataBase (DB).

For example, the media content provided from the content provider may be in an MPEG-2 TS format or an ISO Base Media file format. The transmitting device may convert the media content into a format easy for IP-based delivery and then may transmit the converted media content via a network such as an internet network or may store it in the media DB.

Moreover, the receiving device may receive the media content from the transmitting device by using an IP based transmitting system, and then, may convert and play the received media content or may store it in a local storage.

For example, the receiving device may convert the media content received from the transmitting device into an MPEG-2 TS format or an ISO Base Media file format, and then, may process and play it or may store it in the local storage medium.

In addition, since an IP based open internet environment using HTTP does not guarantee QoS, a bandwidth used for transmitting data to a receiving device according to network traffic changes dynamically. Thus, a stable and fixed bandwidth necessary for transmitting a content file may be hardly obtained.

For example, when a user installs or uses software for frequent network transmission in a home PC system, due to the increase of network traffic, a stable and fixed bandwidth may not be obtained. In order to address such an issue, a method of allocating a bandwidth by an internet gateway to specific software was devised, but has not been widely used until now.

Moreover, even when a fixed bandwidth is guaranteed in a receiving device, since an internet server, i.e. a transmitting device operating in an open internet environment, transmits service via different networks, there still may be difficulties in ensuring QoS.

For example, when services such as YouTube are provided via different networks that specific service providers operate, as network setting or the amount of traffic increases during a transmission process, content may be delayed, dropped, or re-transmitted.

The issue on QoS guarantee may be an important factor that causes content providers, which provide content services in an open internet environment, to feel difficulties.

Moreover, in order to solve the difficulties of the content transmission, provided is an adaptive streaming method that appropriately transmits/receives content according to a network bandwidth by using a play list file in an M3U format.

The adaptive streaming method creates content files having different bit rates with respect to one content and requests transmission by selecting a bit rate according to a bandwidth of a receiving device. Since contents are mostly transmitted using an HTTP protocol in an open internet environment, the adaptive streaming method is also referred to as HTTP adaptive streaming.

FIG. 1 is a block diagram illustrating a configuration of a content transceiving system according to an embodiment of the present invention, and shows one example of a structure of a system for the adaptive streaming.

Referring to FIG. 1, the system for adaptive streaming may include a server 10, a distribution server 20, and a client 30.

When the server 10 delivers Audio/Video (AV) data as raw data to a media encoder 11, the media encoder 51 converts the delivered AV data into a streaming file format of MPEG-2 TS.

Moreover, a stream segmenter 12 may divide the MPEG-2 TS streaming file outputted from the media encoder 11 into a plurality of segments.

For example, the streaming segmenter 12 may divide one file or a real-time MPEG-2 TS streaming file into segments having a size that can be played for about 10 sec, and then, may store them in the distribution server 20.

The client 30 may request the divided files stored in the distribution server 20 through the HTTP protocol, and then, may receive and play them.

Moreover, MPEG-2 TS file segments having different bit rates may be stored in the distribution server 20, and for this, a plurality of web servers 21 storing MPEG-2 TS file segments, each encoded at a specific bit rate, may exist in the distribution server 20.

For example, MPEG-2 TS file segments encoded at a bit rate of about 20 kbps and MPEG-2 TS file segments encoded at a bit rate of about 500 kbps may be stored in the distribution server 20 with different file names.

Accordingly, when the bandwidth of a reception area is reduced, the client 30 may request a file encoded at a bit rate of about 20 kbps and play it for about 10 sec. Then, the client may periodically check the bandwidth again before the presentation time of about 10 sec elapses.

At this point, when the bandwidth is increased to the degree at which a high capacity and high quality file is transferred, the client 30 may request the transmission of a file encoded at a bit rate of about 500 kbps.

Due to this, the client 30 adaptively and alternately may receive contents encoded at bit rates of about 20 kbps and about 500 kbps according a network bandwidth and then may play them. Also, when the bandwidth is poor, the quality of an image may be deteriorated but the image may be continuously displayed.

In order for the adaptive streaming using the HTTP protocol, media content may include a plurality of representations. The media content in each of the representations may have different bit rates, resolutions, languages, or codecs.

The media content may include media components such as audio, video, or timed text, and the representation may be a structured collection of at least one media component.

In this case, the client 30 may request one of a plurality of representations having the different bit rates to the server 20 and may receive it.

Moreover, in order for the client 30 to access the segments and provide streaming service to a user, the server 10 may provide a Media Presentation Description (MPD) including metadata requested by the client 30 in addition to segment data.

The client 30 may select one of the plurality of representations by using an element in the MPD and may request it for transmission.

The representation is divided into the plurality of segments, and a segment or a partial segment may be transmitted in response to the request of the client 30 through the HTTP GET or HTTP partial GET method defined by HTTP 1.1 (RFC 2616).

Furthermore, if bitstream switching is possible, the client 30 may switch a representation received based on information updated during media presentation to another representation.

In this case, the client 30 may receive a new representation from the time when a previous representation is played, and may play it.

Additionally, the segment may include a plurality of subsegments, and the subsegment may mean the smallest unit indexed in a segment level.

Figure 2:
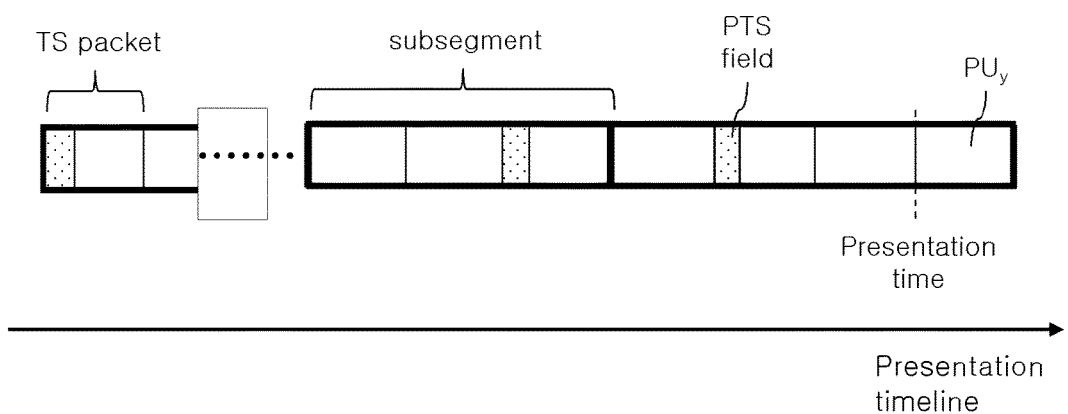
FIG. 2 is a view illustrating a structure of MPEG-2 TS.

Referring to FIG. 2, MPEG-2 TS may include a plurality of MPEG-2 TS packets having the fixed bit rate of 188 bytes, and the subsegment may include continuous MPEG-2 TS packets.

For example, one sample is an access unit including at least one MPEG-2 TS packet having the same Packet Identifier (PID) value, and the segment is defined as one indexed set of continuous access units in decoding order.

Moreover, in order to stream an ISO Base Media file format, a "fragmented file" structure may be used.

For example, the fragmented file divides media tracks into a plurality of fragments physically, and each fragment includes a Movie Fragment (moof) box and a media data (mdat) box.

The mdat box after the moof box includes fragment media data, and a pair of the combined moof-mdat may configure one fragment.

In this case, the subsegment may be defined as a self-contained set of at least one continuous movie fragment, and accordingly, may include at least one moof box and a mdat box corresponding thereto.

According to an embodiment of the present invention, when the media content in the MPEG-2 TS or ISO base media file format is configured with a plurality of representations and is transmitted by a segment unit, the server 10 may align subsegments in a segment in order to efficiently perform bitstream switching in the client 30.

Moreover, the case that the media content in the MPEG-2 TS or ISO base media file format is transmitted to internet through HTTP is illustrated above, but the present invention is not limited thereto. A content transceiving method and device according to an embodiment of the present invention may be applicable to media contents of various formats.

Hereinafter, a method of transmitting media content by aligning subsegments will be described in more detail with reference to FIGS. 3 to 11.

Figure 3:
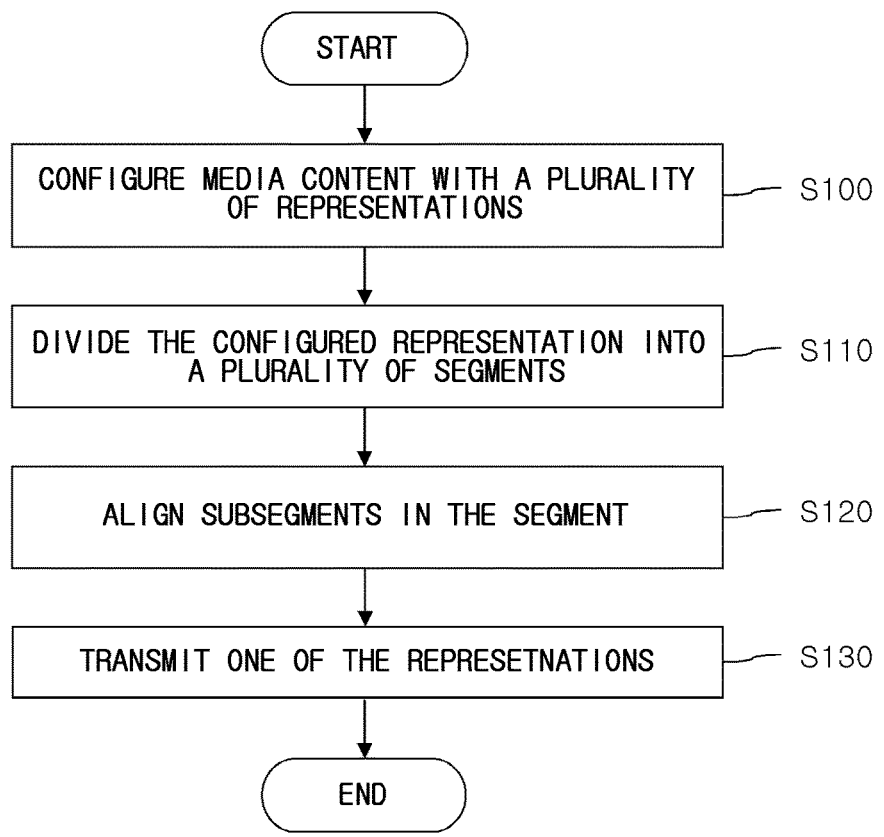
FIG. 3 is a flowchart illustrating a media content transmitting method according to an embodiment of the present invention.

FIG. 3 is a flowchart illustrating a media content transmitting method according to an embodiment of the present invention. The same method described with reference to FIGS. 1 to 2 among transmission methods shown will be omitted.

Referring to FIG. 3, a transmitting device configures a media content with a plurality of representations in operation S100, and divides the configured representation into a plurality of segments in operation S110.

For example, the plurality of representations may be differently configured depending on at least one of the bit rate, resolution, language, and codec of the transmitted media content, and each representation may be divided into a plurality of segments in order for transmission using the HTTP protocol.

Figure 4:
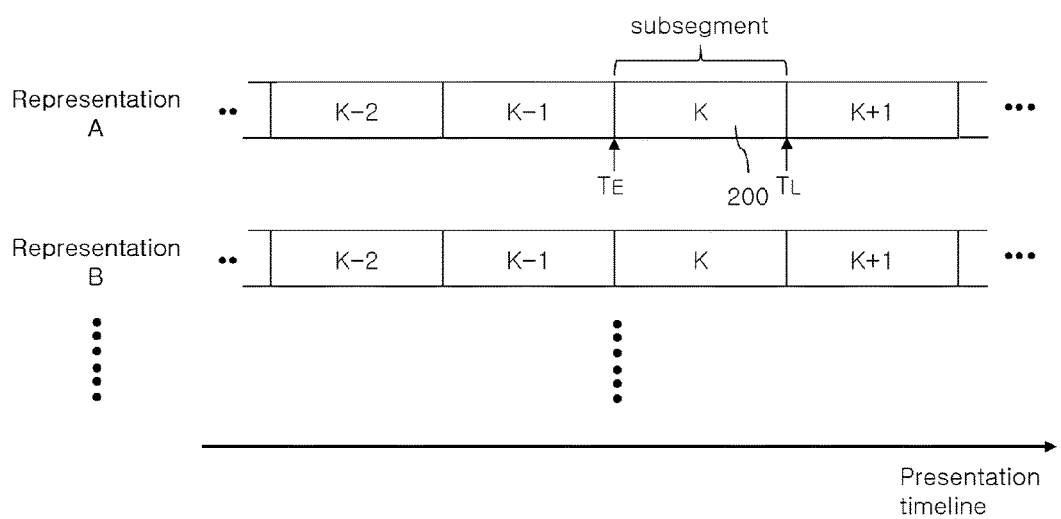
FIG. 4 is a view illustrating a configuration of representations including media content according to an embodiment of the present invention.

Referring to FIG. 4, the transmitting device may configure a media content with a representation A and a representation B having different bit rates, and the representation A and the representation B may form one group. The group may further include other representations besides the representations A and B.

Moreover, there is index information on all subsegments in the representations A and B, and the index information may be used for the client 30 to randomly access the subsegments of the segment through the partial HTTP GET method.

For example, each of the subsegments may include a segment index or there may be an index segment for providing an index on the subsegment.

A method of providing index information on the subsegments will be described in detail with reference to FIGS. 12 to 15.

Additionally, in relation to a subsegment 200, the earliest presentation time TE of the subsegment 200 and the latest presentation time TL of the subsegment 200 may be defined.

Figure 5:
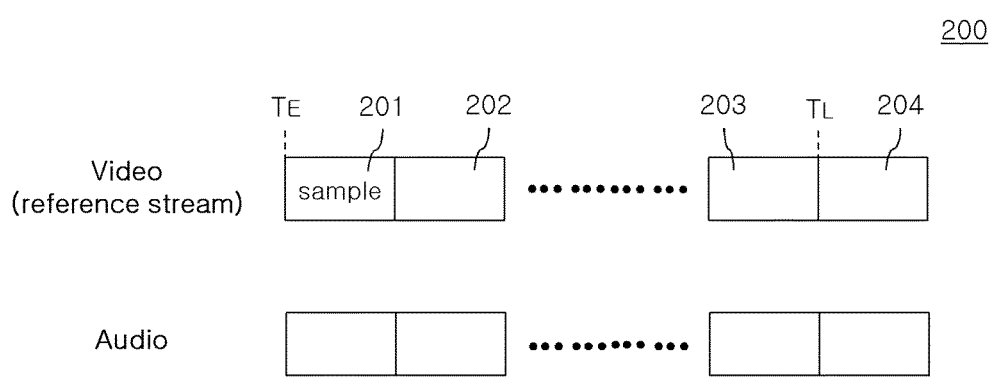
FIG. 5 is a view illustrating a configuration of a subsegment according to an embodiment of the present invention.

Referring to FIG. 5, the subsegment 200 may include two media components such as video and audio, and one of the media components (for example, video) may be designated as reference stream.

That is, the reference stream may mean a group of continuous samples of a primary media component among media components.

In this case, the earliest presentation time TE of the subsegment 200 may be defined as the earliest presentation time of an existing arbitrary sample in the reference stream, and accordingly, may be the presentation time of the earliest sample 201 among video samples.

Also, the latest presentation time TL of the subsegment 200 may be the presentation time of the latest sample 204 in the reference stream.

In addition, the sample 204 may mean an access unit in the stream of the subsegment 200 (or a segment).

The subsegments shown in FIG. 4 may have different sizes or different durations of the media content.

Additionally, although the latest presentation time TL of a segment is positioned at the boundary of continuous subsegments as shown in FIG. 4, it may slightly ahead of the boundary between the subsegments.

That is, in relation to the representation A, the latest presentation time TL of the kth subsegment may be slightly ahead of the time corresponding to the boundary between the kth subsegment and the k+1th subsegment.

Figure 6:
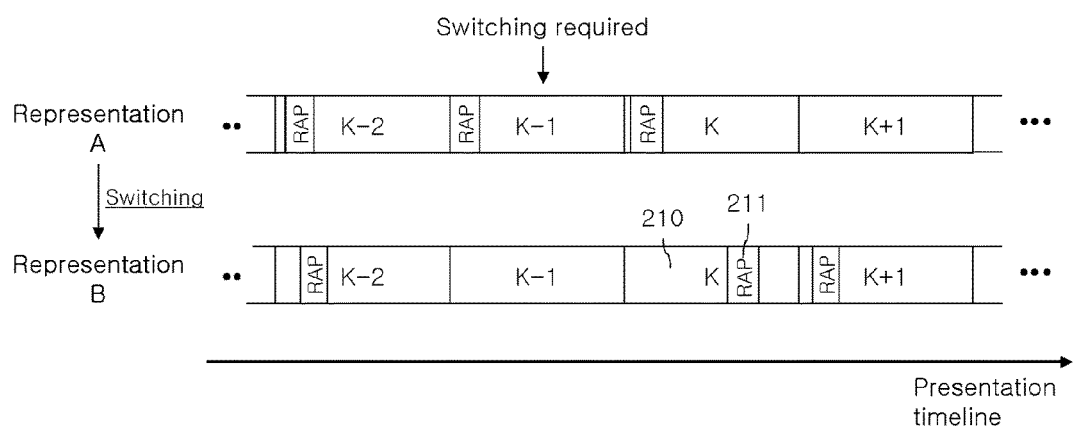
FIGS. 6 and 7 are views illustrating a method of determining the position of a RAP in a subsegment according to an embodiment of the present invention.

Referring to FIG. 6, a segment includes at least one representation access point (RAP) and the RAP may be included in a subsegment.

The client 30 may play forward from the position corresponding to the RAP by using only information in a subsegment, and the RAP may include a byte index ILRAP and a presentation time TRAP.

The presentation time TRAP may mean the fastest presentation time to allow all access units having a presentation time greater than or identical to the TRAP to properly perform decoding.

Moreover, when bitstream switching is requested from the representation A to the representation B, the client 30 searches the RAP from the representation B at the presentation time closest to a current presentation time, and then, plays the representation A until the RAP 211 in the kth subsegment 210, and plays the representation B after the searched RAP 211.

Although a subsegment does not include a RAP or includes one RAP as shown in FIG. 6, it may include at least two RAPs. In this case, the RAP in FIG. 6 may mean the fastest RAP among the RAPs in a subsegment.

Figure 7:
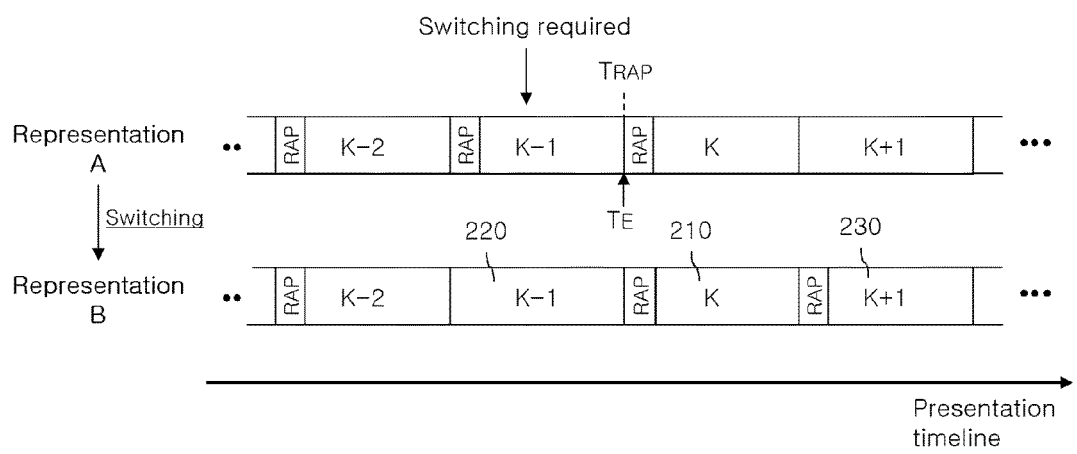

Referring to FIG. 7, the presentation time TRAP of the first RAP in a subsegment may correspond to the fastest presentation time TE of a corresponding subsegment.

Thus, with respect to all segments (contatins_RAP=1) including the RAP, the presentation time TRAP of the first RAP in the subsegment is allowed to be the fastest presentation of a corresponding subsegment. Therefore, the client 30 may switch representations at an arbitrary boundary between continuous subsegments having continuous indices.

For example, as shown in FIG. 7, after bitstream switching is requested, the client 30 may switch a representation at a desired arbitrary position from among the boundary between the k−1th subsegment 220 and the kth subsegment 210 or the boundary between the kth subsegment 210 and the k+1th subsegment 230.

Hereinafter, as described with reference to FIG. 7, it is assumed that the presentation time TRAP of the first RAP in a subsegment corresponds to the fastest presentation time TE of a corresponding subsegment.

A transmitting device aligns subsegments in the segment in operation S120.

In operation S120, the server 10 may align the subsegments in the segment in order to prevent the duplicate reception or loss of data provided to the client 30 during bitstream switching.

Referring to FIG. 8(a), the fastest presentation time TE of the Kth subsegment 200 of the representation A may be less than the latest presentation time TL of the k−1th subsegment 230 of the representation B.

In this case, when bitstream switching from the representation A to the representation B is requested, the client performs switching at the boundary between the k−1th subsegment 220 and the kth subsegment 210 of the representation B, and then, plays the representation B.

Moreover, since the client 30 already receives the kth subsegment 210 of the representation A before the switching, part of the kth subsegment 200 may be redundantly provided to the client 30.

For example, the redundant data may be some samples having a fast representation time in the reference stream of the kth subsegment 200.

Accordingly, in order not to provide the redundant data to the client 30 during the switching process, the fastest presentation time TE of the Kth subsegment 200 of the representation A needs to be greater than the latest presentation time TL of the k−1th subsegment 230 of the representation B.

Referring to FIG. 8(b), the fastest presentation time TE of the Kth subsegment 210 of the representation B may be less than the latest presentation time TL of the k−1th subsegment 240 of the representation A.

In this case, when bitstream switching from the representation A to the representation B is requested, the client performs switching at the boundary between the k−1th subsegment 220 and the kth subsegment 210 of the representation B, and accordingly, part of the k−1th subsegment 240 may not be provided to the client 30 and may be lost.

For example, the missing data may be some samples having a late representation time in the reference stream of the k−1th subsegment 240.

Accordingly, in order to prevent the missing data during the switching process, the fastest presentation time TE of the Kth subsegment 210 of the representation B needs to be greater than the latest presentation time TL of the k−1th subsegment 240 of the representation A.

That is, in order to prevent the redundant data or missing data during a bitstream switching process, subsegments may be aligned to allow the fastest presentation time TE of the Kth subsegment 200 in one of the representations A and B to be greater than the latest presentation time TL of the k−1th subsegment 230 in another representation.

Figure 9:
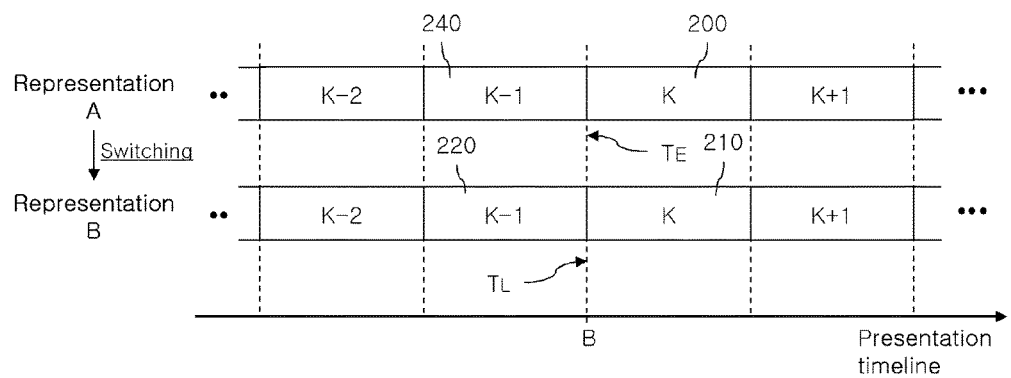

As shown in FIG. 9, two subsegments having different indices in the representations A and B may be aligned for non-overlapping.

As mentioned above, the non-overlapping of the first and second subsegments may mean that, with respect to all media streams of one media component, the fastest presentation time TE of the first subsegment is less than the latest presentation time TL of the second subsegment, or the latest presentation time TL of the first subsegment is less than the fastest presentation time TE of the second subsegment.

According to the subsegment aligning method, when the subsegments in the representations A and B are aligned as shown in FIG. 9, even if the client 30 switches to an arbitrary subsegment including the RAP in the representation B, redundant data or missing data may be prevented.

When subsegments are aligned as shown in FIG. 9, even when switching from the representation B to the representation A is requested, the data provided to client 30 may not be redundant and lost.

Figure 10:
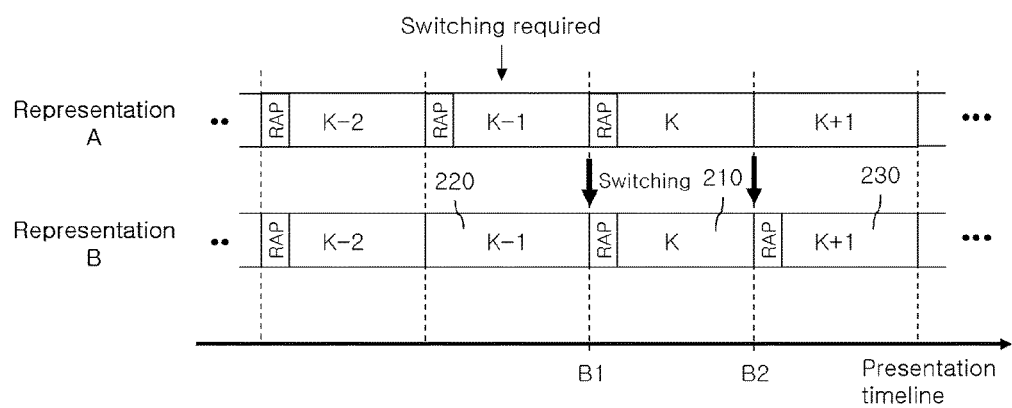

Referring to FIG. 10, when switching from the representation A to the representation B is requested, the client 30 searches the RAP positioned after a current presentation time from the representation B, and switches a representation at an arbitrary point of the boundary between the k−1th subsegment 220 and the kth subsegment 210 or the boundary between the kth subsegment 210 and the k+1th subsegment 230.

Figures 11, 12:
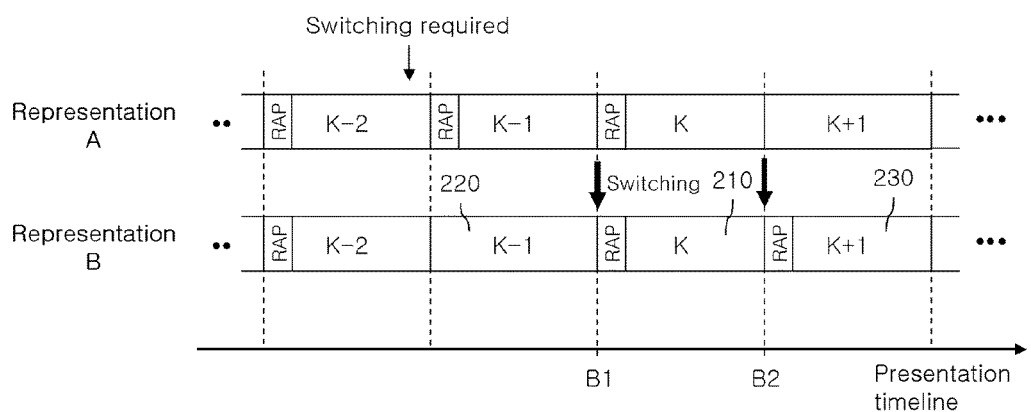

Moreover, as shown in FIG. 11, since the k−1th subsegment 220 of the representation B does not include a RAP, the client 30 may switch a representation at an arbitrary boundary among the boundaries B1 and B2 of subsegments including a RAP after the k−1th subsegment 220.

When the subsegments are aligned as mentioned above, a transmitting device transmits one of a plurality of presentations in operation S130.

For example, the client 30 may select one of a plurality of representations having the different rates, resolutions, languages, or codecs of media content by using an MPD provided from the server 10, and then, may request a segment or partial segment corresponding to the selected representation by using the HTTP GET, or HTTP partial GET method defined by HTTP 1.1 (RFC 2616).

Moreover, the MPD may include a bitstream switching flag indicating whether bitstream switching is performed on representations and a subsegment alignment flag indicating whether subsegments are aligned.

When the bitstream switching flag in the MPD is 'true', the client 30 may perform the bitstream switching operation.

Additionally, when the subsegment alignment flag in the MPD is 'true', subsegments are aligned as shown in FIGS. 9 to 11, and accordingly, the client 30 switches a representation at an arbitrary boundary by continuous subsegments without redundant and missing data.

According to an embodiment of the present invention, there is index information on all subsegments; the presentation time TRAP of the first RAP in the subsegment is the fastest presentation time TE of a corresponding subsegment; and the kth subsegment in the arbitrary first representation among a plurality of representations is aligned to be greater than the latest presentation time TL of the k−1th subsegment in the arbitrary second representation. Therefore, the missing data or redundant reception occurring during bitstream switching may be prevented.

Moreover, a client receiving media content may easily switch a representation in an arbitrary subsegment including a RAP without additional search of parsing, and accordingly, even when bitstream is switched due to a change in a network state, media content may be seamlessly played.

Moreover, in order to divide MPEG-2 TS media into segments for transmission, as required by the transport protocol, the MPEG-2 TS media may be roughly divided according to the duration of a reference program element (this means the reference stream). The boundary between the segments may be aligned according to MPEG-2 TS packets.

In relation to the metadata delivered for the MPEG-2 TS media, one program element in a program is selected as a reference, and the fastest presentation time for Play Unit (PU) of the reference program element may be delivered in a segment.

Additionally, with respect to each subsegment, a data offset and a stamp PTS for the fastest presentation time of a corresponding subsegment are delivered, and the presentation time of a random access point and whether PTS discontinuity occurs may be delivered selectively.

Furthermore, the presentation time of the random access point and whether PTS discontinuity occurs may be used when the client 30 synchronizes a PTS-PCR based time line with a media presentation time line.

The metadata may be expressed with a binary format based on general ISO Base Media file format data types, and this may have a similar structure to a 'sidx' box used in Dynamic adaptive streaming over HTTP (DASH).

In addition to the function of the 'sidx' bix, the format of metadata may allow the client 30 to synchronize an MPEG-2 PTS-PCR based time line with a media presentation time line.

This may be accomplished by delivering the fastest PTS of a PU in a subsegment, and additionally, information on discontinuity in the MPEG-2 PTS time line may be delivered.

FIGS. 12 and 13 are views illustrating a configuration of a segment index box providing metadata on media content according to a first embodiment of the present invention.

Referring to FIG. 12, the meta data may include an MPEG-2 segment index ('m2si') box. The m2si box may provide indices on m2si boxes different from subsegments in one segment.

The index may directly refer to a subsegment, or may refer to segment indices that reference a subsegment. The segment index may be designated as a class, a daisy-chain or another format in order to deliver the time and byte offset on another m2si box in the same segment or a subsegment.

The fastest presentation time of the reference program element in the segment may be recorded in the segment index.

The reference type indicates whether a corresponding reference relates to a subsegment or an M2si box, and the offset indicates a distance in a byte unit from the first byte of the first subsegment indexed in a corresponding box to the first byte of a referenced entity.

The fastest presentation time (with respect to a reference program element) of the first subsegment recorded in the index is provided, and the segment index may provide one entry for each subsegment recorded by a corresponding index.

With respect to each of the subsegments, subsegment duration is provided, and the fastest presentation time of a subsegment may be calculated by adding the subsegment duration of a previous subsegment to the fastest presentation time of the first subsegment.

The fastest presentation time of the subsegment may mean the fastest presentation time on the presentation timescale of an arbitrary PU in the reference program element of a corresponding subsegment.

Selectively, the fastest PTS of the reference program element may be delivered together with a flag indicating whether a subsegment starts with a PTS discontinuity.

Additionally, the segment index box may include a random access point.

Referring to a syntax structure of the m2si box shown in FIG. 13, flags may be defined with the following values as 24-bit integers.

timescale-present indicates whether there is a time scale of a media presentation time in a corresponding box and its flag value may have '0x000001'.

timescale is a time scale for presentation and when timescale is provided more than once in one media presentation, its value may be identical to an entire presentation.

reference_PID provides the PID of MPEG-2 TS packets transmitting a reference program element.

program_element_count indicates the number of program elements indexed in the next loop and can be set to 1 or greater.

reference_count indicates the number of elements indexed in the second loop and can be set to 1 or greater.

PID indicates the PID of MPEG-2 TS packets transmitting a program element that provides presentation_time, and one PID in a corresponding loop is identical to reference_PID.

earlist_presentation_time indicates the fastest presentation time on a PU in a program element identified by PID.

When reference_type is set to '0', the reference represents a subsegment, and when reference_type is set to '1', the reference represents an m2si box.

Discontinuity can be set to '1' to indicate that a corresponding subsegment starts with PTS discontinuity.

contains_PTS can be set to '1' to indicate that PTS of the first PU of a reference program element is delivered in a corresponding subsegment.

contains_RAP can be set to '1' to indicate that a reference program element in the referenced subsegment includes a random access point (RAP).

reference_offset indicates a distance in a byte unit from the first byte of the first subsegment indexed in a corresponding box to the first byte of a subsegment referenced by the iteration of a corresponding loop.

subsegment_duration delivers the sum of subsegment_duration fields in a corresponding box, when the reference represents an m2si box, and also, delivers a difference between the fastest presentation time of an arbitrary PU of a reference program element in the next subsegment and the fastest presentation time of an arbitrary PU of a reference program element in the referenced subsegment, when the reference represents a subsegment. The duration may be represented as a signaled timescale.

PTS indicates the fastest MPEG-2 TS PTS of a reference program element in a corresponding subsegment.

RAP_delta_time provides a presentation time offset of an RAP for earlist_presentation_time of a reference program element when contains_RAP is set to '1'. Moreover, when contains_RAP is '0', RAP_delta_time is maintained with a value of '0'.

Moreover, when contains_PTS is '1', the PTS provides the fastest PTS of a reference program element in a corresponding subsegment.

The metadata having the above configuration may be delivered to the client 30 through various methods.

For example, the metadata represented with the binary format may be attached to the front of MPEG-2 TS as a header of segments. The boxes may be positioned before the first byte of an indexed subsegment, and in this case, the data offset may include the size of the metadata boxes.

Additionally, when a subsegment is referenced, the first byte of a subsegment may be interpreted as the first byte of a metadata box indexing the subsegment.

The metadata expressed in XML or a binary format may be delivered to the client 30 as an additional file, and this may be an HTTP resource or provided out-of-band for the client 30.

In this case, the metadata are provided as an additional resource on HTTP, and the client 30 uses HTTP URL to obtain a corresponding resource. Accordingly, this may be provided from an MPD as a mechanism similar to URL information for media segments.

However, a set of the metadata boxes may be grouped into one file. Accordingly, the overhead of a storage medium may be reduced and the delivery may be facilitated, and also, different segment sizes may be adaptive.

For this, in a segment level of a given representation, an additional indexing mechanism based on a super-segment may be required to index a set of the boxes.

Figures 14, 15, 16:
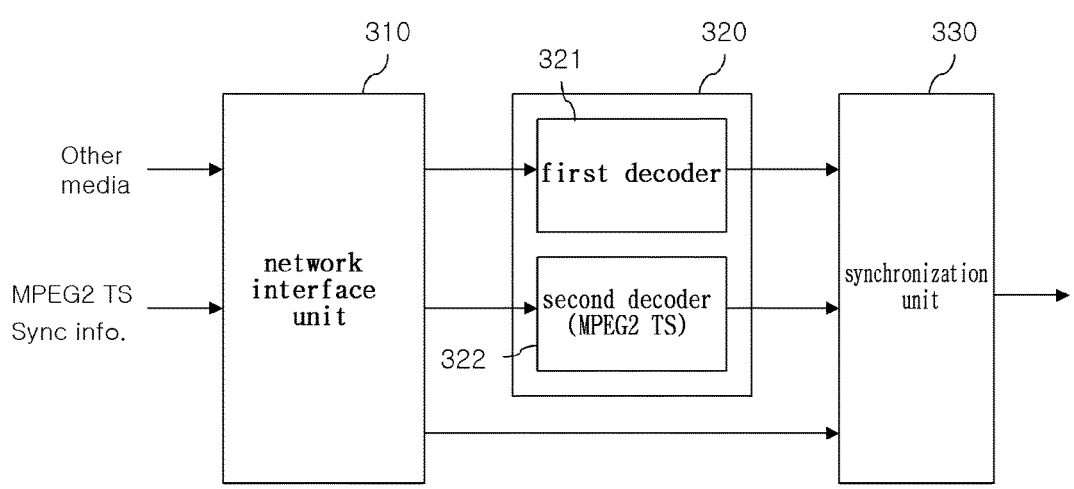
FIGS. 14 and 15 are views illustrating a configuration of the segment index box according to a second embodiment of the present invention.
FIG. 16 is a block diagram illustrating a configuration of a media content receiving device according to an embodiment of the present invention.

FIGS. 14 and 15 are views illustrating a configuration of the segment index box, i.e., a configuration of a super-segment index box, according to a second embodiment of the present invention.

Referring to FIG. 14, the MPEG-2 super-segment index box (mp2s) may provide an index on a set of the MPEG-2 segment index boxes (m2si) for at least one segment in a representation.

Referring to the syntax structure of the mp2s box shown in FIG. 15, reference_count indicates the number of segments indexed by a corresponding loop.

segment_index is a unique segment index of a segment used by segment list generation.

m2si_count indicates the number of MPEG-2 segment index boxes (m2si) in one segment identified by current segment_index.

offset indicates a distance in a byte unit from the first byte of the first MPEG-2 segment index box (m2si) indexed by a corresponding loop to the first byte of the first MPEG-2 segment index box (m2si) for the indexed segment.

A media content transmitting device according to an embodiment of the present invention may perform at least some of the operations of the server described with reference to FIGS. 1 to 15, and for this, may include the media encoder 11 configuring media content with a plurality of representation and the segmenter 12 dividing the configured representation into a plurality of segments.

Hereinafter, a device and method for receiving media content will be described with reference to FIGS. 16 to 17 according to embodiments of the present invention.

A receiving device 300 may perform an operation of the client 30 described with reference to FIGS. 1 to 15.

Additionally, since a configuration of a media content that the receiving device 300 receives, for example, configuration of a representation, a segment, and a subsegment, may be identical to the configuration described with reference to FIGS. 3 to 11, its detailed description will be omitted.

FIG. 16 is a block diagram illustrating a configuration of a media content receiving device according to an embodiment of the present invention. The receiving device 300 includes a network interface unit 310, a decoding unit 320, and a synchronization unit 330.

Referring to FIG. 16, the network interface unit 310 of the receiving device 300, for example, an HTTP interface, may receive a media file in addition to the synchronization information, and the decoding unit 320 may decode and output the received media file.

Moreover, the synchronization unit 330 synchronizes the decoded media file with a media presentation time line by using a media presentation time in the synchronization information.

For example, the network interface unit 310 may receive the synchronization information (Sync Info.) having the same configuration described with reference to FIGS. 6 to 13 in addition to MPEG-2 TS.

The decoding unit 320 may include a second decoder 322 for decoding MPEG-2 TS, and the second decoder 322 may be a general MPEG-2 TS decoder.

The second decoder 322 may receive MPEG-2 TS from the network interface unit 310, and may decode it, and then, may output the decoded PUs and their PTSs.

Moreover, the synchronization unit 330 may identify a PU having a presentation time provided through the received synchronization information. For this, the network interface unit 310 may restore the PTSs of PUs having a presentation time provided and may deliver them to the synchronization unit 330, or the PTS of a corresponding PU in addition to the presentation time may need to be provided from the transmitting device 100.

In order to restore the PTS, elementary stream time recovery may be used.

Additionally, the decoding unit 320 may further include a first decoder 321 for decoding other media received through the network interface unit 310, and the first decoder 321 may be a decoder for decoding another format of media such as a 3GPP file format, or the same MPEG-2 TS decoder as the second decoder 322.

The synchronization unit 330 may synchronize the MPEG-2 TS based media outputted from the second decoder 322 with other media outputted from the first decoder 321 by using the encoding information (for example, media presentation times on PUs) delivered from the transmitting device 100.

Moreover, the receiving device 300 may play the MPEG-2 TS based media synchronized by the synchronization unit 330 and the other media simultaneously.

Figure 17:
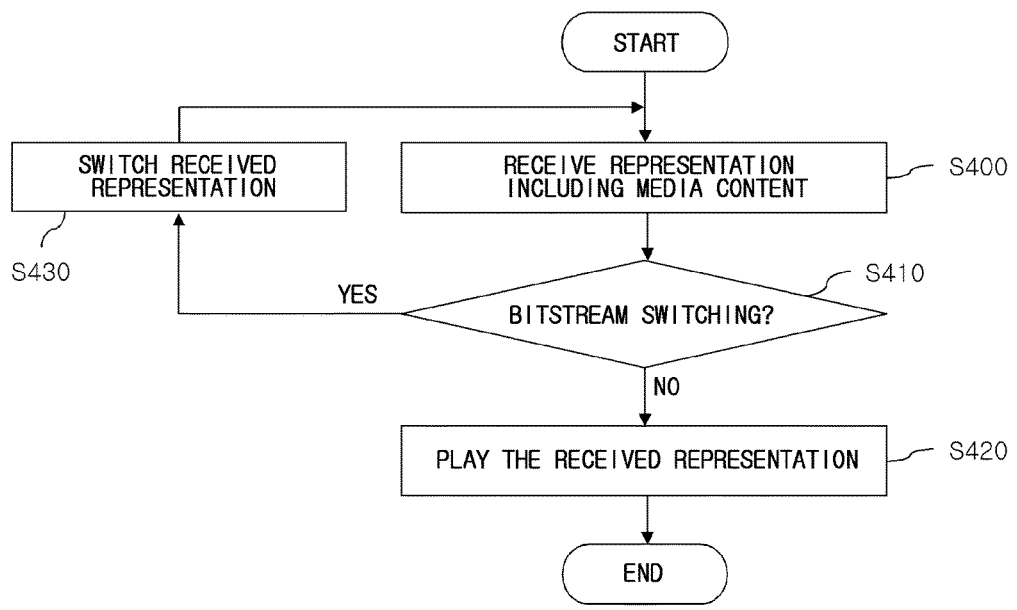
FIG. 17 is a flowchart illustrating a media content receiving method according to an embodiment of the present invention.

FIG. 17 is a flowchart illustrating a media content receiving method according to an embodiment of the present invention. The same method described with reference to FIGS. 1 to 16 among receiving methods shown will be omitted.

Referring to FIG. 17, the transmitting device 300 receives a plurality of representations including media content in operation S400, and plays the received representation in operation S420.

For example, a receiving unit (not shown) in the network interface unit 310 of the transmitting device 300 may request transmission for a segment or a partial segment to a transmitting device by using the HTTP GET or HTTP partial GET method defined by HTTP 1.1 (RFC 2616).

In addition, a control unit (not shown) in the network interface unit 310 may select the representation to be received from among a plurality of representations having the different bit rates, resolutions, languages, or codes of media content by using an MPD received from the transmitting device.

While the received representation is played, the control unit confirms whether bitstream switching is required in operation S410.

When the bitstream switching is required, the control unit switches the received representation to a new representation in operation S430.

A method of the control unit in the transmitting device 300 to switch representations may be identical to the switching operation of the client 300 described with reference to FIGS. 3 to 11.

The method of receiving and processing media content described with reference to FIGS. 1 to 17 may be performed by an IPTV receiver.

Hereinafter, a configuration of an IPTV receiver will be described with reference to FIGS. 18 and 19 according to an embodiment of the present invention.

Figure 18:
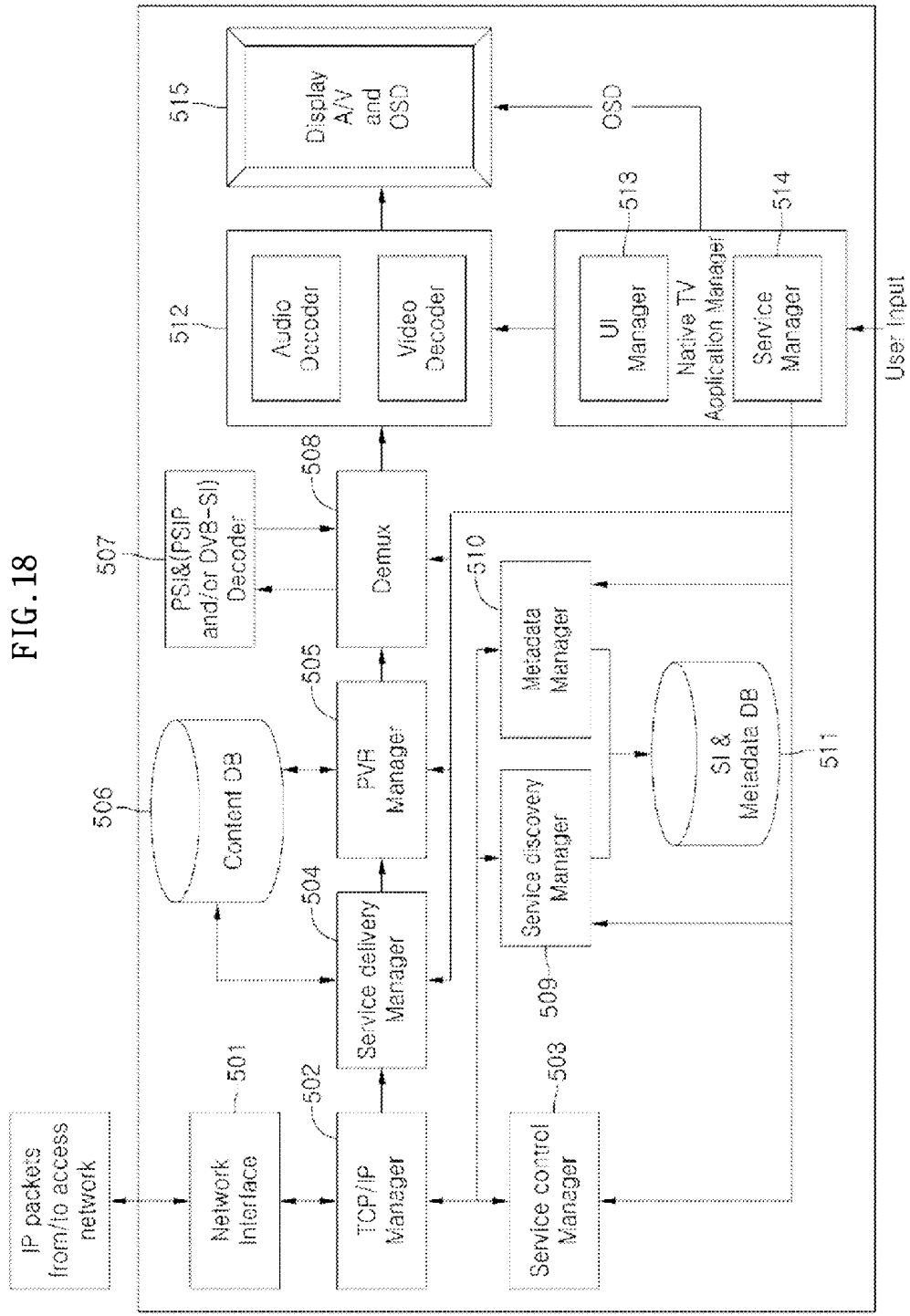
FIG. 18 is a block diagram illustrating a configuration of an IPTV receiver according to a first embodiment of the present invention.

FIG. 18 is a block diagram illustrating a configuration of an IPTV receiver according to an embodiment of the present invention.

The IPTV receiver may include an additional tuner to receive terrestrial broadcasting, cable broadcasting, and satellite broadcasting. However, for convenience of description, a configuration of receiving an IPTV service provided using an IP network will be mainly described.

Moreover, an ITF represents an Open IPTV Terminal Function, and may mean a receiver consisting of a function module necessary for providing IPTV service.

The IPTV receiver may include a Network Interface 501, a TCP/IP Manager 502, a Service Delivery Manager 504, a PVR Manager 505, a Demux 508, a Data Decoder 507, an Audio/Video Decoder 512, an A/V Display & OSD Module 515, an Application Managers 513 and 514, a SI & Metadata DB 511, a Service Discovery Manager 509, a Service Control Manager 503, a Metadata Manager 510, and a Content DB 506.

Referring to FIG. 18, the network interface 501 receives packets from a network, and transmits packets to a network. That is, the network interface 501 receives service and media content from a service provider via a network.

The TCP/IP manager 502 is involved in packet delivery from a source to a destination, with respect to packets received by an IPTV receiver and packets transmitted from an IPTV receiver. Additionally, the TCP/IP manager 502 classifies received packets to correspond to an appropriate protocol, and outputs packets classified by the service delivery manager 504, the service discovery manager 509, the service control manager 503, and the metadata manager 510.

The service delivery manager 504 controls received service data. For example, while controlling realtime streaming data, the service delivery manager 504 may use RTP/RTCP.

When the realtime streaming data are transmitted using a RTP, the service delivery manager 504 parses the received data packets according to the RTP to transmit them to the demux 508, or store them in the content DB 506 according to a control of the service manager 514. Additionally, the service delivery manager 504 feeds back the network reception information to a server providing service by using RTCP.

The demux 508 demultiplexes the received packets into audio, video, and Program Specific Information (PSI) data, and then, transmits them to the audio/video decoder 512, and the data decoder 507, respectively.

The data decoder 507 decodes service information such as PSI. That is, the data decoder 507 receives a PSI section, a Program and Service Information Protocol (PSIP) section, or a DVB-Service Information (SI) section, demultiplexed by the demux 508, and then, decode it.

Additionally, the data decoder 507 decodes the received sections and creates a database on service information, and also stores the database on the service information in the SI & Metadata DB 511.

The Audio/Video Decoder 512 decodes the video and audio data received from the demux 508. The video and audio data decoded by the Audio/Video Decoder 512 decodes are provided to a user through the A/V Display & OSD Module 515.

The application manager manages overall states of the IPTV receiver, provides a user interface, and manages another manager. For this, the application manager includes a user interface manager 513 and a service manager 514.

The user interface manager 513 provides a graphic user interface to a user through on screen display (OSD), and performs an operation of a receiver according to an input after receiving a key input from a user. For example, when receiving a key input relating to a channel selection from a user, the user interface manager 513 transmits the key input signal to the service manager 514.

The service manager 514 controls a service related manager such as the service delivery manager 504, the service discovery manager 509, the service control manager 503, and the metadata manager 510.

Additionally, the service manager 514 creates a channel map and selects a channel by using the channel map according to a key input received from the user interface manager 513. Also, the service manager 514 receives service information on a channel from the data decoder 507, and sets the audio/video PID of the selected channel to the demux 508.

The service discovery manager 509 provides information necessary for selecting a service provider that provides service. When a signal on channel selection is received from the service manager 512, the service discovery manager 509 discovers service by using the information.

The service control manager 503 is responsible for service selection and control. For example, when a user selects an existing broadcasting method such as live broadcasting service, the service control manager 503 uses IGMP or RTSP. When a user selects video on demand (VOD) service, the service control manager 503 selects and controls the service by using RTSP.

The RTSP may provide a trick mode on realtime streaming. Additionally, the service control manager 503 may initialize and manage a session through an IMC gateway by using IP Multimedia Subsystem (IMS) and Session Initiation Protocol (SIP). The above protocols are just one example, and may vary depending on embodiments.

The metadata manager 510 manages service related metadata and stores the metadata in the SI & Metadata DB 511.

The SI & Metadata DB 511 stores system information decoded by the data decoder 507, metadata that the metadata manager 510 manages, and information necessary for selecting a service provider provided by the service discovery manager 509. Additionally, the SI & Metadata DB 511 may store setup data for a system.

The SI & Metadata DB 511 and the content DB 506 may be implemented using nonvolatile RAM (NVRAM) or flash memory, and using two areas that are logically separated on the same storage area.

The PVR manager 505, as a module for recording and playing live streaming content, collects metadata on recorded content and also generate additional information such as an thumbnail image or index provided to a user.

Functions of the control unit in the IPTV receiver may be divided and implemented by a plurality of modules such as the TCP/IP Manager 502, the Service Delivery Manager 504, the PVR Manager 505, the Application Managers 513 and 514, the Service Discovery Manager 509, the service control manager 503, and the metadata manager 510.

For example, the TCP/IP manager 502 controls the network interface 501 to request only a payload or segment corresponding to a specific package (for example, a package that the IPTV receiver subscribes) to a server by filtering SD&S information with the target package information and receive it.

Moreover, the TCP/IP manager 502 filters the SD&S information received in a multicast method by using the target package information, and allows the data decoder 507 to parse and process only a payload or segment corresponding to a specific package.

Figure 19:
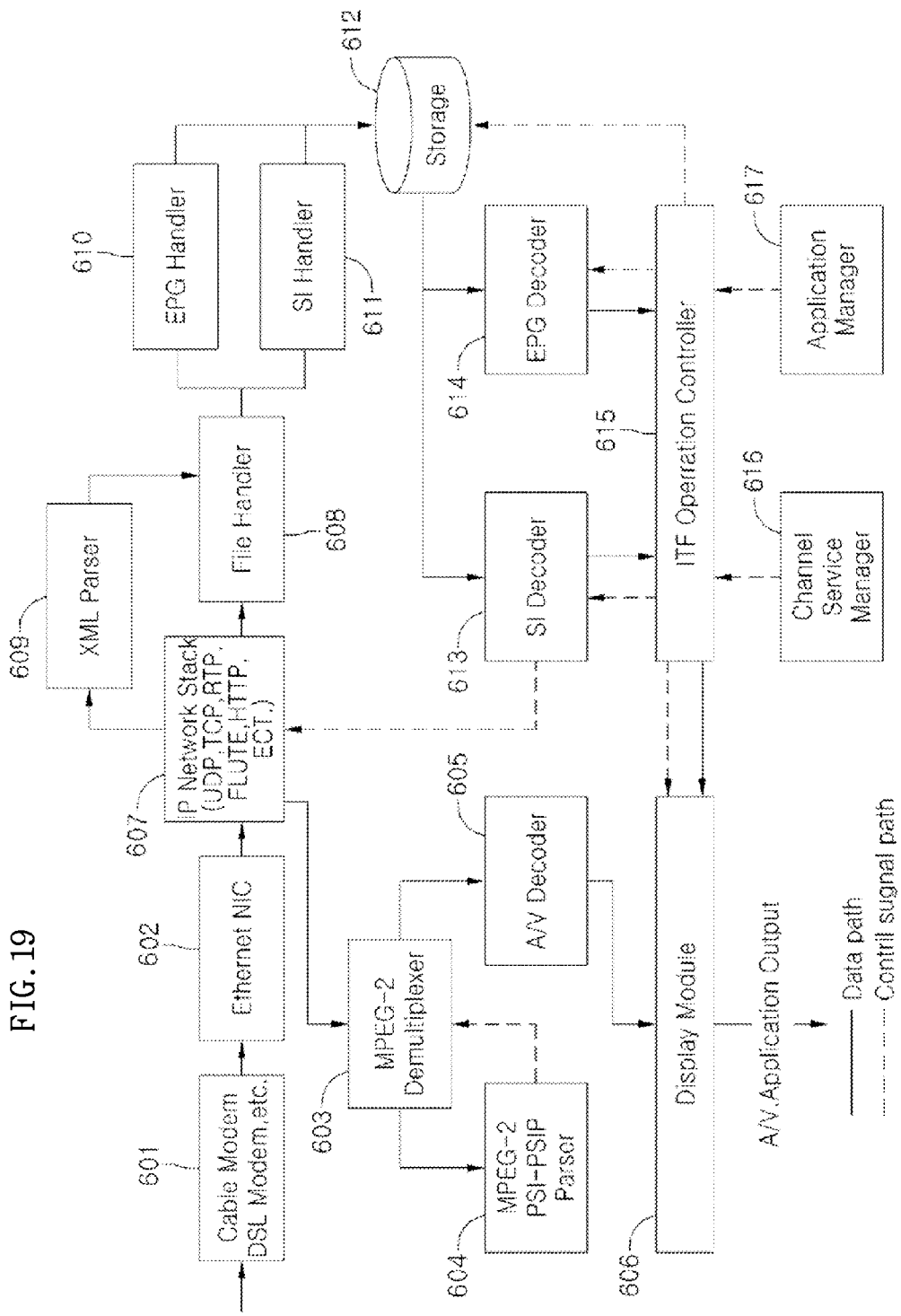
FIG. 19 is a block diagram illustrating a configuration of an IPTV receiver according to a second embodiment of the present invention.

FIG. 19 is a block diagram illustrating an configuration of an IPTV receiver according to another embodiment of the present invention. The configuration of the IPTV receiver is represented with functional blocks. The solid line arrow of FIG. 19 corresponds to a data path, and the dotted line arrow corresponds to a control signal path.

A Cable modem, DSL modem, etc 601, as an interface allowing an ITF to connect to an IP network in a physical level, restores a digital signal by demodulating a signal transmitted through a physical medium.

An Ethernet NIC 602 restores a signal received through the physical interface to IP data and an IP Network Stack 607 processes each layer according to an IP protocol stack.

Moreover, an XML Parser 609 parses XML document among the received IP data, and a File Handler 608 processes data in a file format, which are transmitted through FLUTE, among the received IP data.

An SI Handler 611 processes a portion corresponding to IPTV service information in the received data in a file format, and stores it in a storage 612, and also processes a portion corresponding to IPTV EPG information in the received data in a file format, and stores it in the storage 612.

The storage 612 stores various data such as the SI and EPG.

An SI Decoder 613 receives SI data from the storage 612 and analyzes them to obtain channel map information. An EPG Decoder 614 analyzes the EPG data stored in the storage 612 and restores information necessary for EPG configuration.

An ITF Operation Controller 615 is a main controller controlling a channel change or an operation of an ITF such as an EPG display.

A Channel Service Manager 616 performs an operation such as channel change according to a user input. An Application Manager 617 performs application service such as an EPG display according to a user input.

An MPEG-2 Demultiplexer 603 extracts MPEG-2 Transport Stream data from the received IP datagram and delivers them to a corresponding module according to PID.

Additionally, an MPEG-2 PSI/PSIP Parser 604 extracts the PID of A/V data or PSI/PSIP data including access information on a program element from the MPEG-2 Transport Stream and parses them.

Moreover, an A/V Decoder 605 decodes inputted audio and video data and delivers them to a display module 606, and the display module 606 outputs the decoded A/V data or application.

According to an embodiment of the present invention, when a media content configured with a plurality of representations having different bit rates is transmitted/received by a segment unit, the loss or duplicate reception of data, which occur during bit stream switching, may be prevented by aligning subsegments in the segment in synchronization with the presentation time of a representation.

Additionally, a client receiving media content may easily switch a representation in an arbitrary subsegment including a Representation Access Point (RAP) without additional searching or parsing.

Accordingly, even when bit stream switches due to a change in a network state, media content is seamlessly played.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of transmitting media content through an HTTP server, the method comprising:
   generating, through a media encoder, the media content with a plurality of representations including a first representation and a second representation;
   dividing, through a segmenter, the first representation into a plurality of segments, wherein a plurality of subsegments are included in each segment of the first representation;
   dividing, through the segmenter, the second representation into a plurality of segments, wherein a plurality of subsegments are included in each segment of the second representation; and
   transmitting, through a transmitter, the plurality of segments of at least one of the first representation and the second representation, wherein the each segment of the first representation and the second representation includes a segment index box which provides an index on the plurality of subsegments in the each segment, wherein the plurality of segments of the first representation is indexed by an index segment, wherein the index segment includes a segment index box which provides an index on a set of the segment index boxes for the plurality of segments of the first representation, and wherein the segment index box of the index segment has a loop in which segment index information for the plurality of segments of the first representation is included.

2. The method according to claim 1, wherein the plurality of subsegments of the first representation and the plurality of subsegments of the second representation are aligned to allow an earliest presentation time of a mth subsegment of the first representation to be greater than a latest presentation time of a nth subsegment of the second representation.

3. The method according to claim 1, wherein the plurality of subsegments of the first representation and the plurality of subsegments of the second representation are aligned to allow a latest presentation time of a mth subsegment of the first representation to be less than an earliest presentation time of a nth subsegment of the second representation.

4. The method according to claim 1, wherein a mth subsegment of the first representation and a nth subsegment of the second representation are aligned not to be overlapped if $TL(m,i)<TE(n,i)$ or if $TL(n,i)<TE(m,i)$, wherein the $TE(m,i)$ is an earliest presentation time of any access unit in stream i of a subsegment of the first representation, the $TL(m,i)$ is a latest presentation time of any access unit in stream i of a subsegment of the first representation, the $TE(n,i)$ is an earliest presentation time of any access unit in stream i of a subsegment of the second representation and the $TL(n,i)$ is a latest presentation time of any access unit in stream i of a subsegment of the second representation.

5. The method according to claim 1, wherein the plurality of representations are differently configured according to a bit rate of the transmitted media content.

6. The method according to claim 1, wherein with respect to a subsegment including a representation access point (RAP) among the subsegments, a presentation time of the first RAP in the subsegment corresponds to the earliest presentation time of the subsegment.

7. The method according to claim 1, further comprising transmitting a media presentation description (MPD) including metadata to access the segments, wherein the MPD comprises a first flag indicating whether bitstream switching can be performed on the plurality of representations and a second flag indicating whether the plurality of subsegments in the first representation and the plurality of subsegments in the second representation are aligned.

8. A device for transmitting media content through an HTTP server, the device comprising:

a media encoder to configure the media content with a plurality of representations including a first representation and a second representation;

a segmenter to divide the first representation into a plurality of segments and the second representation into a plurality of segments, wherein a plurality of subsegments are included in each segment of the first representation and the second representation; and a transmitter to transmit the plurality of segments of at least one of the first representation and the second representation, wherein the each segment of the first representation and the second representation includes a segment index box which provides an index on the plurality of subsegments in the each segment, wherein the plurality of segments of the first representation is indexed by an index segment, wherein the index segment includes a segment index box which provides an index on a set of the segment index boxes for the plurality of segments of the first representation, and wherein the segment index box of the index segment has a loop in which segment index information for the plurality of segments of the first representation is included.

9. The device according to claim 8, wherein the plurality of subsegments of the first representation and the plurality of subsegments of the second representation are aligned to allow an earliest presentation time of a mth subsegment of the first representation to be greater than a latest presentation time of a nth subsegment of the second representation.

10. The device according to claim 8, wherein the plurality of subsegments of the first representation and the plurality of subsegments of the second representation are aligned to allow a latest presentation time of a mth subsegment of the first representation to be less than an earliest presentation time of a nth subsegment of the second representation.

11. The device according to claim 8, wherein a mth subsegment of the first representation and a nth subsegment of the second representation are aligned not to be overlapped if $TL(m,i)<TE(n,i)$ or if $TL(n,i)<TE(m,i)$, wherein the $TE(m,i)$ is an earliest presentation time of any access unit in stream i of a subsegment of the first representation, the $TL(m,i)$ is a latest presentation time of any access unit in stream i of a subsegment of the first representation, the $TE(n,i)$ is an earliest presentation time of any access unit in stream i of a subsegment of the second representation and the $TL(n,i)$ is a latest presentation time of any access unit in stream i of a subsegment of the second representation.

12. The device according to claim 8, wherein the plurality of representations are differently configured according to at a bit rate of the transmitted media content.

13. The device according to claim 8, the device transmits a media presentation description (MPD) including metadata to access the segments, wherein the MPD comprises a first flag indicating whether bitstream switching can be performed on the plurality of representations and a second flag indicating whether the plurality of subsegments in the one segment of the first representation and the plurality of subsegments in the one segment of the second representation are aligned.

14. A device for receiving media content through an HTTP client, the device comprising:

a network interface to receive the media content with one of a plurality of representations including a first representation and a second representation; and a service control manager to switch between the first representation and the second representation, wherein the plurality of representation includes a plurality of segments and each segment includes a plurality of subsegments;

wherein the each segment of the first representation and the second representation includes a segment index box which provides an index on the plurality of subsegments in the each segment, wherein the plurality of segments of the first representation is indexed by an index segment, wherein the index segment includes a segment index box which provides an index on a set of the segment index boxes for the plurality of segments of the first representation, and wherein the segment index box of the index segment has a loop in which segment index information for the plurality of segments of the first representation is included.

15. The method according to claim 1, wherein each segment index box includes earliest presentation time of an access unit in each subsegment.

16. The device according to claim 8, wherein each segment index box includes earliest presentation time of an access unit in each subsegment.

17. The device according to claim 14, wherein each segment index box includes earliest presentation time of an access unit in each subsegment.

\* \* \* \* \*